Oct. 25, 1932.  L. E. KOCH ET AL  1,883,957
MAGNETICALLY OPERATED VALVE
Filed Oct. 17, 1927   3 Sheets-Sheet 3

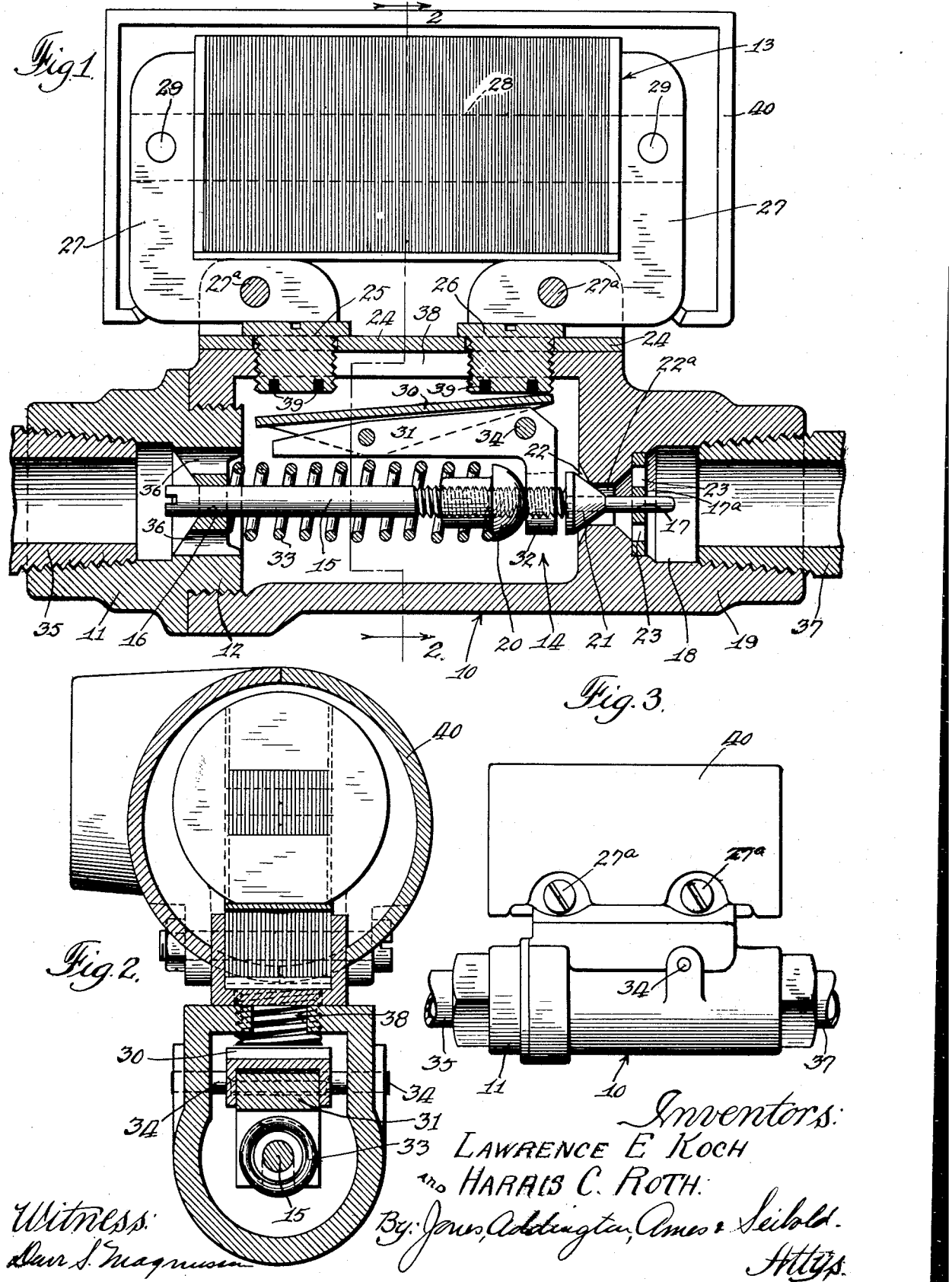

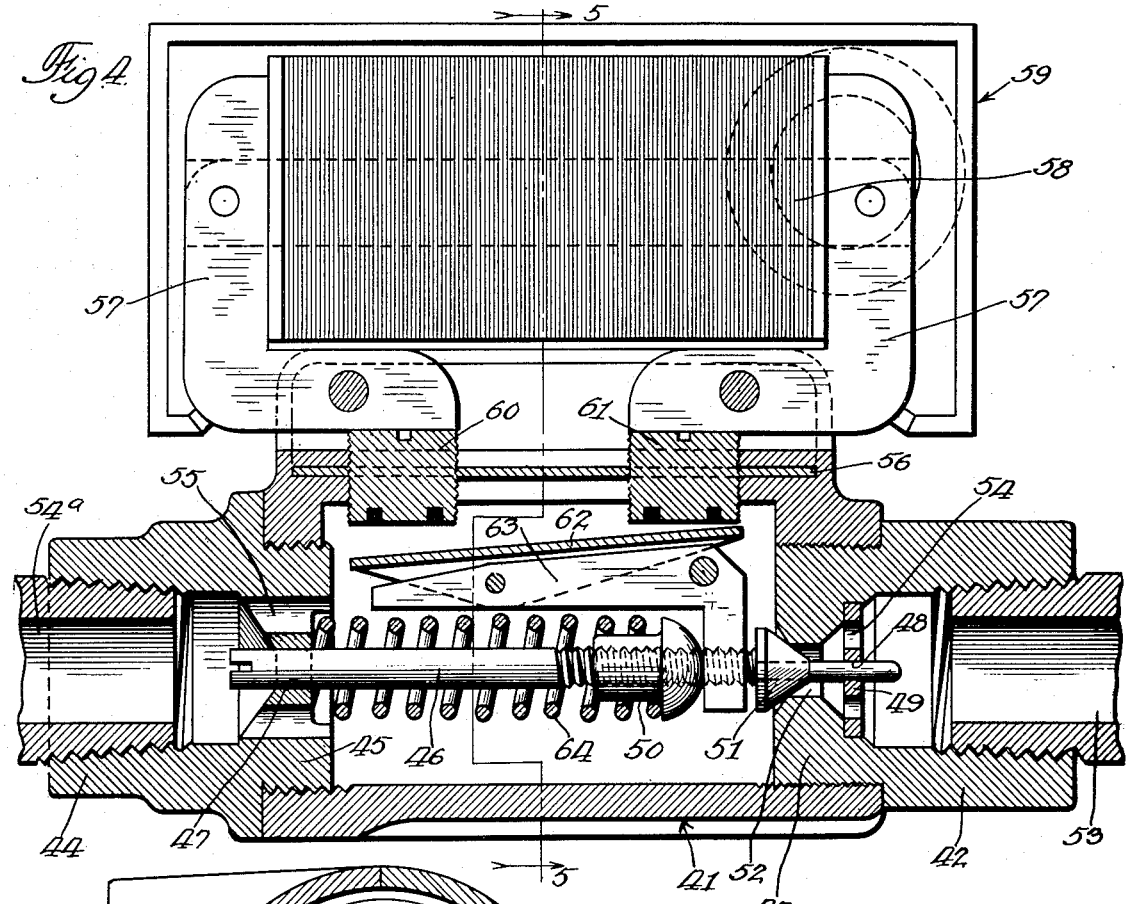

Inventor.
LAWRENCE E KOCH.
HARRIS C. ROTH.
By Jones, Addington, Ames & Seibold.
Attys.

Witness:
Dave S. Magnusson.

Patented Oct. 25, 1932

1,883,957

UNITED STATES PATENT OFFICE

LAWRENCE E. KOCH AND HARRIS C. ROTH, OF ELKHART, INDIANA, ASSIGNORS, BY MESNE ASSIGNMENTS, TO MINNEAPOLIS-HONEYWELL REGULATOR COMPANY, OF MINNEAPOLIS, MINNESOTA, A CORPORATION OF DELAWARE

MAGNETICALLY OPERATED VALVE

Application filed October 17, 1927. Serial No. 226,730.

This invention relates to magnetically operated valves and has special reference to magnetically operated valves of a type wherein the medium may have a direct passage therethrough, the body portion of the valve being of a low magnetic permeability and the medium having a cooling effect upon the coils of the electromagnet.

More particularly, this invention relates to a magnetically operated valve to be employed particularly in association with automatic heating systems wherein, for the purpose of heating the boiler or furnace, a burner is supplied with fuel through a conduit to be opened or closed at will by means of the present invention.

Automatic heating systems are usually equipped with controls responsive to variations of temperature in a room or other enclosure which is to be heated. For example, such a control may comprise a wall thermostat which when an electrical circuit is established therethrough energizes the electromagnet of the magnetically operated valve to permit a flow of fuel therethrough to the burner. Other forms of controls for such heating systems are those directing the specific limits of temperature or pressure to be obtained by the boiler or furnace. These instruments may include a water thermostat on a hot water heating boiler, a pressure switch on a steam or vapor boiler or an air thermostat upon a hot air furnace, all of which singly, or when connected in series with each other, may be operated to energize the electromagnet valve to permit a flow of fuel to the burner.

One of the objects of this invention is to provide a magnetically controlled valve which is simple in operation, compact and unitary in form, and durable.

Another object of this invention is to provide a magnetically controlled valve wherein the fuel may flow through a single direct passageway in the valve.

A further object of this invention is to provide a magnetically controlled valve wherein a minimum of electrical energy is required to unseat the valve to permit a flow of fuel therethrough.

A still further object of this invention is to provide a magnetically controlled valve wherein the medium passing therethrough acts as a cooling agent for the coils of the electromagnet.

It is also the object of this invention to provide an electromagnetic valve wherein the valve apart from the electromagnetic means is of a low magnetic permeability.

Further objects of this invention will be apparent from the description and drawings forming a part of this specification to which latter reference may now be had for a more complete understanding of the characteristic features of this invention, in which drawings:

Figure 1 is a vertical central section through the magnetically controlled valve;

Fig. 2 is a transverse sectional view taken on the line 2—2 of Fig. 1;

Fig. 3 is a side elevational view of Fig. 1;

Fig. 4 is a view similar to Fig. 1 showing a modification thereof;

Fig. 5 is a sectional view taken on the line 5—5 of Fig. 4;

Fig. 9 is a central sectional view of a portion of a magnetically controlled valve showing a modified form of valve mechanism.

Figure 6:
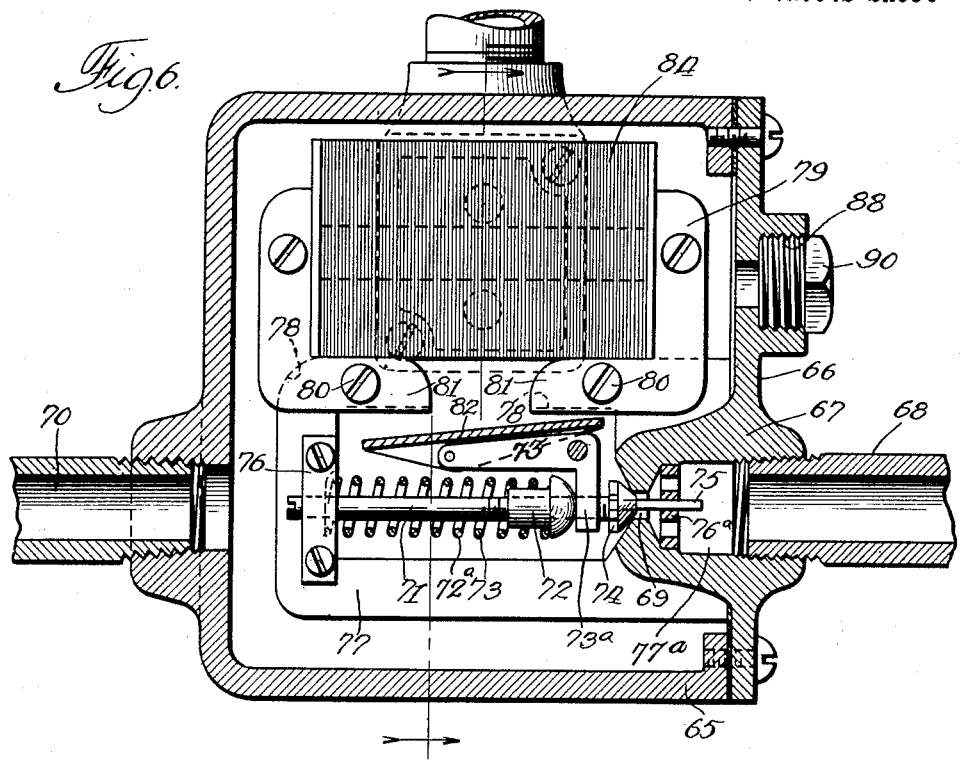
Fig. 6 is a view similar to Fig. 1 showing a further modification thereof.

Referring now to the drawings and more particularly to Figs. 1 to 3, inclusive, thereof, the construction shown therein comprises two unitary portions or members. One of these members comprises the main body portion 10 which may preferably be cast of brass or any other suitable material of relatively low magnetic permeability and is enclosed at one of its ends by means of a cap 11, the latter member having an externally threaded reduced portion 12 for engaging an internally threaded end portion. A solenoid or valve coil 13 is secured to the upper side wall of the main body portion. It will be noted that these two members extend in a horizontal direction and are positioned in parallel planes; that is to say, their axes are parallel. However, this is for purposes of illustration only and the valve may be positioned in a vertical plane or any other desirable plane, the operation thereof being effectively the same.

By referring more particularly to the main body portion 10, a central aperture or chamber 14 is formed therein for receiving the valve mechanism. The valve mechanism comprises a valve stem 15 supported and guided at one end in an aperture 16 provided in the valve cap 11 and at the other end by an aperture 17 which latter is formed in an annular disc 17a and is seated in an aperture 18 of the threaded end portion 19. The guiding means provided by these apertures 16 and 17 prevent the misalignment of the plunger relative to the valve seat which materially increases the life of the valve and makes the operation positive. The valve stem is threaded at one end thereof to receive in threaded engagement therewith a preferably case-hardened abutment 20 which latter comprises a collar portion having a head of a hemispherical shape preferably integral therewith. This construction, of course, permits of an adjustment of the abutment along the valve stem 15. The threaded portion of the valve stem 15 is reduced at its outermost end and has a valve plunger 21 secured thereto for engaging a valve seat 22 formed on the periphery of port 22a which latter communicates with the aperture 18 through a plurality of comparatively small apertures 23 in the disc 17.

The upper side of the main body portion 10 has a flattened bearing surface upon which is mounted a channel member 24 which latter is preferably formed of brass and is secured to said body portion by means of screw threaded plugs 25 and 26 inserted through apertures provided therein and in a threaded engagement with the body portion. The plugs 25 and 26 are formed of iron and are continuous with the iron circuit formed through the solenoid 13. The circuit through the solenoid 13 is determined by a plurality of iron laminæ 27 secured to the brass channel 24 by means of screws 27a. The lower spaced ends of the laminæ rest on the plugs 25 and 26 and extend horizontally therefrom to the end of the coil and then vertically to a position near the top thereof. Each intermediate laminæ has a horizontally extending portion 28 extending from the vertical portion through the center of the solenoid to be secured at its outer end to the vertically extending member of the opposite laminæ by means of pins 29.

When the solenoid is energized, a magnetic flux flows through the iron circuit of the laminæ, the circuit being completed through the plug 26, an armature 30 and the plug 25. The armature 30 comprises a channel shaped member preferably formed of an electric dynamo steel and is pivotally mounted to a pivotally mounted L-shaped actuating member 31, which latter is preferably of cast iron. The vertically extending portion of the actuating member 31 is bifurcated as at 32 and is disposed between the hemispherical head of the abutment 20 and the valve plug 21. A spring 33 is disposed between the end of the plug 11 and the head of the collar 20 and normally tends to urge the valve plunger 21 into engagement with its seat. However, when the solenoid 13 is energized the electromagnet lines thread through the plugs 25 and 26 and urge the armature 30 into engagement therewith. This action causes the actuating element 31 to pivot on the pin 34 whereby the bifurcated portion 32 urges the abutment 20 against the action of the spring to unseat the valve plunger 21. When the solenoid 13 is deenergized the spring 33 urges the bifurcated portion 32 back to its normal position whereby the valve plunger 21 is seated.

When the valve plunger 21 is unseated a supply of fuel or other medium may flow from the inlet conduit 35, which latter is in threaded engagement with the valve cap 11, through a plurality of apertures 36 into the chamber 14 and thence through the port 22a, apertures 23 to the outlet conduit 37 which latter is in threaded engagement with the end portion 19. It will be noted that the conduits 35 and 37 are substantially coaxial and that the medium has a single direct passageway therethrough. It will also be noted that by means of providing a double pivot whereby the armature is pivotally mounted on the pivotally mounted actuating member, a very short movement of the armature is necessary to complete the magnetic circuit. Moreover, the horizontal length of the actuating member may be of any desired length whereby a very desirable leverage may be obtained, the energy obtained through the magnetic circuit being greatly multiplied thereby.

The material of the main body portion of the valve between the plugs 25 and 26 is cut away as at 38 to provide a high magnetic reluctance. Were this aperture 30 omitted, a very high loss of electrical energy and an excessive amount of heat would result due to the short circuiting of the brass in the iron circuit. This aperture is sealed by means of the brass channel 24, said channel serving to great advantage in this present construction in eliminating noises generally encountered, as well as increasing the efficiency of the valve when operating on alternating circuits. However, there may be several very desirable methods of providing a seal for the aperture 38, although in this construction the utilization of the channel 24 to serve as a connecting means for the iron laminæ 27 and the plugs 25 and 26 and the plugs in turn serving to connect the channel to the main body of the valve would seem to be the most simple and most desirable method.

It may be desirable to position a shading coil 39 of copper at the lower ends of the plugs 25 and 26, they being particularly desirable when an alternating current is used for the operation of the magnetic valve. This entire assembly is applicable to any commercial voltage or frequency, except that the wire used in winding the coil of the solenoid 13 may be of a smaller or greater cross section as desired. The solenoid may be protected by means of a casing 40 of a shape to conform to the contour of the solenoid, the casing being suitably secured to the supports for said solenoid or the brass channel 24 as by means of the screws 27a.

It is highly desirable that the walls of the casing 40 be very thin, the size being in conformity with the strength of the material used which is preferably a non-conducting material or a material which has a high resistance. This construction will substantially eliminate or at least minimize the losses due to eddy currents and the like.

In order to provide a valve in which the body portion, apart from the electromagnetic means for controlling the operation thereof, is of a maximum magnetic reluctance, reference may now be had to Figs. 4 and 5. This embodiment comprises a main body portion 41 which is preferably molded of a material such as is known to the trade as "Bakelite" or other similar compositions. The body portion is hollow to provide a chamber for receiving the operating mechanism. A cap 42, preferably of brass and having a reduced knurled end portion 43, is disposed at one end of the main body portion, the knurled portion thereof being molded in the composition. A cap 44, preferably of brass and having a reduced threaded end portion 45 threadedly engages the threads provided in the opposite end of the main body portion 41.

The valve mechanism in this embodiment is the same as that of the previously described device and comprises a valve stem 46 supported and guided at one end in an aperture 47 formed in the cap 44 and at the other end by an aperture 48 formed in an annular disc 49, which latter is seated in the cap 42. The collar 50, having a head portion of a hemispherical shape, is adjustably mounted on the valve stem 46, and the valve stem is reduced at its outer end to receive a valve plunger 51 which latter engages a valve seat formed on the periphery of a port 52. The port 52 is in communication with the chamber formed in the main valve portion 41 and is also in communication with an outlet pipe 53 through ports 54 in the annular disc 49. An inlet conduit 54a engages the cap 44 and permits a supply of fuel or other medium to enter the chamber of the main valve portion through the apertures 55 located around the aperture 47.

A channel shaped member 56 is molded in the upper portion of the main body portion, the flanges thereof extending upwardly to receive therebetween a plurality of iron laminæ 57 for forming the iron circuit for the solenoid 58. These iron laminæ form a core around which the coil is wound in the same manner as has been previously described in Fig. 1 of the drawings and it is not thought necessary to elaborate thereupon. A casing 59 extends around the solenoid 58 and is of a thin non-conducting material to provide against magnetic losses as has been heretofore described.

A pair of iron plugs 60 and 61 are molded in the upper portion of the main body portion and extend therethrough into the chamber for housing the valve mechanism. The outer surfaces of the plugs are knurled so that they may have a fixed engagement with the main body portion, the plugs extending through apertures formed in the channel shaped member 56. It is desirable that the channel shaped member 56 be of a metal of low magnetic permeability and since the molded material of the main body portion is nonconductive, a path of high reluctance is formed between the iron plugs 60 and 61.

When the coil of the solenoid is energized a magnetic flux flows through the iron circuit of the laminated core 57, the plug 60 and armature 62 to the other plug 61 and thence back to the laminated core 57. The armature 62 is thus attracted to a position such that a maximum magnetic path is produced therethrough and such action pivots an L-shaped actuating element 63 to a position to open the valve plunger 51 as described in the preceding embodiment. When the coil of the solenoid 58 is deenergized the armature 62 drops to its normal resting position, the spring 64 extending between the cap 44 and the collar 50 urging the valve plunger 51 into engagement with its seat. The movement of the valve plunger 51 thus controls the flow of the medium through the valve.

Figure 7:
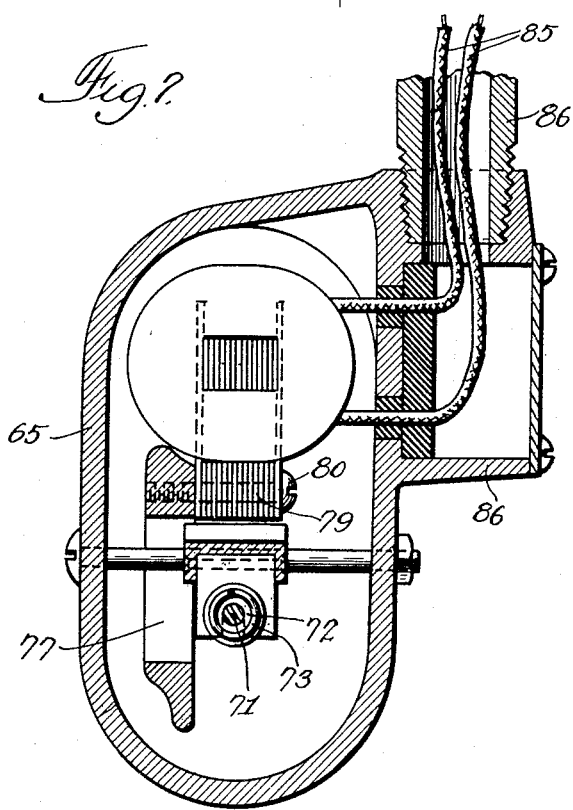
Fig. 7 is a sectional view taken on the line 7—7 of Fig. 6.
Figure 8:
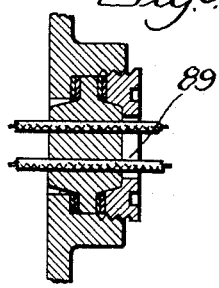
Fig. 8 is a detail view of an electrical connector therefor.

By referring now more particularly to Figs. 6, 7 and 8 of the drawings a further embodiment of this invention is shown in which the electromagnetic means and the valve mechanism are disposed in a single casing so as to unify the structure and permit the cooling of the coil of the electromagnetic means.

This construction comprises an enlarged casing 65 having an open end which is enclosed by means of a cover 66. The cover has an enlarged portion 67 projecting on each side thereof, one side being adapted to receive an outlet conduit 68 in threaded engagement thereof and the other side containing a valve seat extending on the outer face of a port 69. An inlet conduit 70 preferably in axial alignment and on the opposite side of the outlet conduit 68 is in threaded engagement with a threaded aperture in the casing 65 and in communication with the chamber formed therein.

The valve mechanism for controlling the supply of medium from the inlet conduit 70 to the outlet conduit 68 is substantially the same as that described in the previously recited embodiments and includes a valve stem 71 having an adjustable collar portion 72 which engages and, by means of a coil spring 72a, exerts a pressure against the downwardly projecting leg 73a of an actuating member 73. A valve plunger 74 is provided on a reduced portion 75 coextensive with the valve stem 71 and preferably integral therewith. The valve plunger 74 coacts with the valve seat adjacent the port 69 and is suitably held in alignment therewith by means of the valve stem 71 being guided in an aperture formed in a plate 76 secured to a supporting member 77. The supporting member 77 is preferably mounted on the cover 66 for convenience in assembling the construction. The other end of the valve stem 71 is supported and guided by means of the reduced portion 75 engaging an aperture in an annular disc 76a disposed in a recess within the enlarged portion 77a coextensive with the threaded aperture into which the conduit 68 is engaged.

The supporting member 77 is preferably substantially U-shaped having inwardly extending extensions 78 to which a laminated iron core portion 79 is secured as by means of screws 80. This laminated core portion 79 is substantially the same as that which has been previously described in the preceding figures, the lower ends 81 thereof being spaced a substantial distance apart. In this embodiment the previously described iron plugs are omitted and the end portions 81 act to attract an armature 82 for actuating the actuating element 73. When the coil 84 disposed on the horizontally extending core portion is energized the magnetic flux flows through the ends 81 of the laminated core 79 to attract the armature 82 to permit of a maximum magnetic path, the armature 82 being urged into contact with the end portions 81 to actuate the valve plunger 74 to control the flow of the medium through the valve.

In this embodiment, the medium flowing through the valve is stored in the chamber provided by the main body portion and passes thereout when the valve plunger 74 is drawn away from contact with its seat. The medium thus stored in the chamber of the main body portion serves as a cooling agent for the magnetic coil 84. Further a great amount of time and material is saved in providing this unitary construction, the convenience in assembling being particularly great. Further, magnetic losses will be reduced to a minimum, the structure being entirely enclosed and the material for such an enclosure being of low magnetic permeability.

As shown more particularly in Fig. 7, the leading-in wires 85 for the electromagnetic coil 84 may be brought through a conduit 86 in threaded engagement with a projecting portion 87 preferably cast integrally with the casing 65. This portion forms a chamber into which a sealing compound may be poured to properly secure the wires in a desired position. However, in order that the leading-in wires may be readily disconnected or connected, a threaded aperture 88 is formed in the cover 66 for receiving a pair of terminals 89 mounted in a suitable block. The aperture may be closed by means of a plug 90 when not in use.

The valve construction as illustrated in Fig. 9 is directed to a modified form of valve mechanism wherein the specific guiding means of the previous embodiments have been eliminated by reason of the construction of the valve plunger. A main body portion 91 is provided with a central chamber 92 for receiving a valve mechanism, the body portion to be preferably formed of a material of low magnetic permeability. The chamber 92 is provided with inlet and outlet openings 93 and 94, respectively, the inlet opening being formed in a cap 95 threaded in one end of said body portion and the outlet opening being formed in a projection 96 formed preferably integrally with the body portion.

A plug 97 is threaded in a contracted portion of the outlet 94 and is provided with an opening 98 extending therethrough and in communication with the chamber 92. A valve seat 99, preferably frusto-conical shaped, is formed on the inner face of the plug 97 terminating in the opening 98 and is for the purpose of cooperating with a valve mechanism to open and close the passageway through the valve.

The valve mechanism comprises a valve stem 100 having a reduced portion for engaging a bifurcated end portion of an actuating element 101. A ball-shaped plunger 102 preferably integrally formed on the reduced portion of the valve stem 100 is normally urged into engagement with the frusto-conical shaped valve seat 99 by means of a compression spring 103 extending between the cap 95 and an enlarged portion 104 of the valve stem. The position of the spring 103 is definitely determined because one end thereof is positioned in a recess 104 formed in the cap 95 and the other end thereof is disposed around a collar preferably concentric with and fixed to the portion 104.

As in the previous embodiments, the valve is equipped with a solenoid which when energized provides that a magnetic flux flow through an iron circuit of which the iron plugs 105 and 106 are a part. The plugs 105 and 106 are threaded in the upper portion of the valve in a spaced relation, the material of the body portion therebetween being cut away and filled with paint or other like material thereby providing a high magnetic reluctance. An armature 107 completes the iron circuit between the plugs when the coil is energized and when attracted to such a position operates the actuating arm 101 to release the valve plunger 102 from its seat against the tension of the spring 103. It will be noted particularly that due to the spherical contour of the plunger 102 there can be no misalignment between the plunger and the valve seat.

While several embodiments of this invention are herein shown and described, it is to be understood that many modifications therein may occur to those skilled in the art without departing from the spirit and scope of this invention and it is desired that the same shall be limited only by the scope of the appended claim and the showing of the prior art.

We claim:

In a magnetically controlled valve, a main body portion having a chamber and an inlet and an outlet formed therein in communication one with the other, valve mechanism for controlling the passageway therethrough, an armature for controlling the operation of said valve mechanism, a solenoid, a plurality of iron plugs in said body portion in engagement with the core portion of said solenoid for actuating said armature, said body portion being apertured between said plugs to provide a high magnetic reluctance therebetween, and sealing means for said apertured portion comprising a channel-shaped member secured to said body portion by said plugs, said solenoid being secured to said channel-shaped member.

In witness whereof we have hereunto subscribed our names.

LAWRENCE E. KOCH.
HARRIS C. ROTH.